3,413,330
CYCLOALKYLALKYLOXY-ALKYLAMINOETHYL THIOSULFATES AND SALTS THEREOF

Roger D. Westland, Ann Arbor, Mich., assignor to Parke, Davis & Company, Detroit, Mich., a corporation of Michigan
No Drawing. Filed Oct. 14, 1966, Ser. No. 586,646
6 Claims. (Cl. 260—453)

ABSTRACT OF THE DISCLOSURE

Cycloalkyloxy- and cycloalkylalkyloxy-alkylaminoethyl thiosulfates and salts thereof that are useful as antiradiation agents, and their production by (a) reacting a cycloalkyloxy- or cycloalkylalkyloxy-alkyl halide with an alkali metal salt of S-2-aminoethyl thiosulfate; (b) reacting a 2 - [(cycloalkyloxy- or cycloalkylalkyloxy-alkyl)amino]-ethyl disulfide or a mineral acid salt thereof with a salt of sulfurous acid in the presence of an oxidizing agent; (c) reacting a hydrohalide salt of an N-(cycloalkyloxy- or cycloalkylalkyloxy-alkyl)-aminoethyl halide with a thiosulfate salt in an aqueous solvent medium; and (d) reacting a 1-(cycloalkyloxy- or cycloalkylalkyloxy-alkyl)aziridine with thiosulfuric acid or a salt thereof.

Summary and detailed description

The present invention relates to new organic thiosulfate compounds and to methods for their production. More particularly, the invention relates to new aminoethyl thiosulfate compounds, having in the free acid form the formula, $$R_1—A—O—(CH_2)_n—NH—CH_2CH_2—S—SO_3H \quad (I)$$

and to pharmaceutically-acceptable salts thereof; where $R_1$ represents cyclopentyl, cyclohexyl, cycloheptyl, cyclooctyl, methylcyclohexyl, 2-methyl-5-methoxycyclohexyl, cyclohexenyl, or decahydro-2-naphthyl; A represents a direct bond or a linear or branched alkylene radical containing from 1 to 3 carbon atoms; and $n$ is a positive integer having a value from 4 to 8 inclusive.

In accordance with the invention, aminoethyl thiosulfate compounds having the foregoing formula are produced by reacting an alkyl halide compound having the formula $$R_1—A—O—(CH_2)_n—X \quad (II)$$

with an alkali metal salt of S-2-aminoethyl thiosulfate, said salt having the formula, $$H_2N—CH_2CH_2—S—SO_3^-M^+ \quad (III)$$

where M represents an alkali metal, preferably sodium, X is chlorine or bromine, and $R_1$, A, and $n$ have the aforementioned significance. The reaction is normally carried out in a solvent. Suitable solvents for this purpose include water; lower alkanols, such as methanol, ethanol, and isopropyl alcohol; ethers, such as dioxane, tetrahydrofuran, and 1,2-dimethoxyethane; and tertiary amides, such as N,N-dimethylformamide; as well as mixtures of these. A preferred solvent of 95% ethanol. The temperature of the reaction is not critical and may be varied over a wide range from room temperature to about 150° C. It is most convenient to carry out the reaction at the reflux temperature of the reaction mixture. The duration of the reaction is likewise not critical and will vary widely from several hours to several days, depending on the particular reactants and temperature employed. At the reflux temperature, the reaction is normally complete in about 15–20 hours. While equivalent quantities of reactants may be employed, it is preferable to use a moderate excess of the alkali metal salt of S-2-aminoethyl thiosulfate to insure complete reaction.

The alkyl halide compounds having Formula II above that are used as starting materials in the foregoing procedure can be prepared in a number of ways, as described in greater detail hereinafter. In general, these starting materials are obtained by reacting an alkanol compound having the formula $$R_1—A—OH \quad (IV)$$

with an alkylene dihalide compound having the formula $$X—(CH_2)_n—X \quad (V)$$

in the presence of a base, such as sodium hydride; where $R_1$, A, X, and $n$ are as defined earlier.

Also in accordance with the invention, aminoethyl thiosulfate compounds having Formula I and salts thereof are produced by the reaction of a disulfide compound, having the formula $$[R_1—A—O—(CH_2)_n—NH—CH_2CH_2—S]_2 \quad (VI)$$

or a mineral acid salt thereof, with a salt of sulfurous acid in the presence of an oxidizing agent in an unreactive solvent medium; where $R_1$, A, and $n$ are as defined previously. Salts of sulfurous acid that may be used in the reaction include ammonium sulfite, ammonium bisulfite, alkali metal sulfites, alkali metal bisulfites, alkaline earth metal sulfites, and alkaline earth metal bisulfites. When an alkali metal salt of sulfurous acid is employed, an alkali metal bisulfite is preferred over an alkali metal sulfite. The highly preferred sulfurous acid salt is freshly-prepared ammonium sulfite. Oxidizing agents that may be used are air, oxygen, cupric ion, iodosobenzoate ion, and tetrathionate ion. The sulfurous acid salt employed in the reaction also can function as the required oxidizing agent, in which case an additional oxidizing agent is not required. The preferred oxidizing agent, however, is air, and the reaction is most conveniently carried out by bubbling air through the reaction mixture containing the disulfide compound and salt of sulfurous acid until oxidation is complete. Solvents that may be employed in the reaction are water and lower alkanols, such as methanol, ethanol, and isopropyl alcohol, as well as mixtures, of these. A preferred solvent is aqueous methanol. The temperature of the reaction is not critical and may be varied. For convenience, with the use of air as the oxidizing agent, the reaction can readily be carried out at room temperature. The duration of the reaction is likewise not critical, and may be varied from about 5 hours to 48 hours, depending on the method of oxidation employed. When air is used as the oxidizing agent as described above, the oxidation is normally complete after a period of 10–20 hours. To insure complete reaction, the chosen salt of sulfurous acid is employed in large excess, that is, approximately 10 to 15 moles or more of sulfurous acid salt is used for each mole of disulfide compound. The oxidizing agent employed is added in an amount sufficient to effect complete oxidation.

When ammonium sulfite is used in the foregoing reaction, the product is obtained in the free acid form, that is, a compound having Formula I. When an alkali metal bisulfite is employed, the product obtained is an alkali metal salt of the aminoethyl thiosulfate compound having Formula I. In the latter case, it is desirable to neutralize the excess alkali metal bisulfite with the corresponding alkali metal hydroxide prior to isolation of the alkali metal salt.

The disulfite compounds having Formula V above that are used as starting materials in the foregoing process are prepared by the oxidation, for example, by reaction with iodine in an alkanolic solvent, of the corresponding thiol compound, having the formula, $$R_1—A—O—(CH_2)_n—NH—CH_2CH_2—SH \quad (VII)$$

or a mineral acid salt thereof; where $R_1$, A, and $n$ have the same meaning as previously given. The mineral acid salts of the disulfides, which may also be used as starting materials, are prepared by reacting the disulfide with an equivalent amount of mineral acid in an unreactive solvent. The thiol compounds of Formula VII and mineral acid salts thereof can be prepared in a number of ways. For example, an alkyl halide compound having the formula $$R_1—A—O—(CH_2)_{n-1}—X \quad (VIII)$$

is reacted with sodium cyanide to produce a nitrile compound having the formula $$R_1—A—O—(CH_2)_{n-1}—CN \quad (IX)$$

which is reduced by reaction with sodium in ethanol, and the amine compound so produced, having the formula, $$R_1—A—O—(CH_2)_n—NH_2 \quad (X)$$

is reacted with ethyl 2-mercaptoethyl carbonate to give the desired thiol starting material, which may be isolated directly or in mineral acid salt form following reaction with a mineral acid, such as hydrochloric acid. In Formulas VIII, IX, and X, $R_1$, A, X, and $n$ all have the aforementioned significance.

Further in accordance with the invention, aminoethyl thiosulfate compounds having Formula I are produced by reacting a hydrohalide salt of an aminoethyl halide compound, said salt having the formula, $$R_1—A—O—(CH_2)_n—NH—CH_2CH_2—X·HX \quad (XI)$$

with a thiosulfate salt in an aqueous solvent medium, where $R_1$, A, $n$, and X have the same meaning as previously given. Thiosulfate salts that may be used include alkali metal thiosulfates, ammonium thiosulfate, alkaline earth metal thio thiosulfates, and thallous thiosulfate. The preferred thiosulfate salt is sodium thiosulfate because of its ready availability and ease of use. The solvent medium used for this reaction may be water alone or an aqueous mixture of a lower alkanol, such as methanol, ethanol, or isopropyl alcohol. The temperature of the reaction is not critical; it is most convenient to carry out the reaction at or near the reflux temperature of the reaction mixture. The duration of the reaction is likewise not critical; at the reflux temperature it is normally complete after a period of from about 30 minutes to several hours. The completion of the reaction can be determined by acidifying an aliquot of the reaction mixture with mineral acid; failure of sulfur to precipitate indicates that the reaction is essentially complete. It is preferable to employ equivalent quantities of reactants, although a slight excess of either is not harmful. When an excess of sodium thiosulfate is used, the foregoing test for completion of the reaction cannot be used. The product of the reaction can be isolated by cooling or by concentration of the mixture.

The aminoethyl halide hydrohalide salt compound used as a starting material in the foregoing process can be prepared in a number of ways. For example, an amine compound having Formula X above is reacted with ethylene oxide to produce an aminoethanol compound having the formula $$R_1—A—O—(CH_2)_n—NH—CH_2CH_2—OH \quad (XII)$$

which is reacted with a halogenating agent, such as dibromotriphenozyphosphorane, and, if necessary, the product treated with a hydrohalic acid to give the desired aminoethyl halide hydrohalide salt starting material.

Further yet in accordance with the invention aminoethyl thiosulfate compounds having Formula I are produced by reacting an aziridine compound having the formula

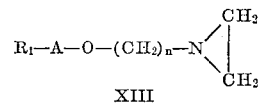

XIII with thiosulfuric acid or a salt thereof; where where $R_1$, A and $n$ are as previously defined. Suitable salts of thiosulfuric acid that may be used in this reaction are alkali metal thiosulfates, such as sodium thiosulfate, alkaline earth metal thiosulfates, ammonium thiosulfate, and thallous thiosulfate. The reaction is carried out in an unreactive solvent medium, which will vary depending on the thiosulfate reactant used. Suitable solvents for use with thiosulfuric acid are water; lower alkanols, such as methanol and ethanol; ethers, such as diethyl ether, tetrahydrofuran, and dioxane; and lower aliphatic ketones, such as aceton and methyl ethyl ketone; as well as miscrible combinations of these. The preferred solvent for use with thiosulfuric acid is methanol. Solvents that may be used for the reaction with an alkali metal thiosulfate, an alkaline earth metal thiosulfate, or thallous thiosulfate are water alone or mixtures of water with any of the following: lower alkanols, dioxane, tetrahyrofuran, 1,2-dimethoxyethane, dimethylsulfoxide, acetone, and methyl ethyl ketone. The preferred solvent is water. In the reaction with ammonium thiosulfate the following solvents may be used: water, lower alkanols, such as methanol and ethanol; ethers, such as diethyl ether, dioxane, and tetrahydrofuran; dimethylsulfoxide; and aromatic hydrocarbons, such as benzene and toluene; as well as miscible combinations of these. The preferred solvent for use with ammonium thiosulfate is methanol.

When an alkali metal thiosulfate, an alkaline earth metal thiosulfate, or thallous thiosulfate is used in the foregoing reaction, sufficient acid must be added to the reaction mixture to maintain neutrality (pH about 7–9). In the usual case, a molar equivalent of any of the following acids will be satisfactory for this purpose: hydrochloric acid, sulfuric acid, nitric acid, perchloric acid, formic acid and acetic acid. Without the acidification step, the reaction will be strongly inhibited by the base that is formed as a secondary product of the reaction. The acidification step is not required when ammonium thiosulfate is used, since the ammonia that is formed as a by-product is not sufficiently basic to inhibit the reaction and may readily be removed from the reaction mixture by heating.

When free thiosulfuric acid is used in this reaction, care must be taken in the preparation and handling of this reactant because of its extreme instability. Free thiosulfuric acid may be prepared by the metathetical reaction of sodium thiosulfate and hydrochloric acid at −78° C. in diethyl ether, or, preferably, by the metathetical reaction of ammonium thiosulfate and sulfuric acid in methanol at −40° C. or below, as described in greater detail hereinafter. For use in the reaction with the aziridine compound of Formula XIII above, the preferred methanolic solution of thiosulfuric acid should be prepared just prior to use, since the acid will decompose appreciably if kept longer than 4–6 hours even at a temperature of −30° C. The reaction with the aziridine compound is then best carried out by slowly adding a cold (−20° C. or below) solution of the aziridine starting material to the freshly prepared thiosulfuric acid solution, maintained at about −40° C., allowing the resulting reaction mixture to warm to room temperature, and then isolating the reaction product after a period of about 10 to 20 minutes by adding a suitable precipitating solvent, such as diethyl ether, cooling and filtering. Longer reaction periods and higher temperatures are neither necessary nor desirable. It is preferable to employ equivalent quantities of the aziridine and thiosulfuric acid, although a slight excess of thiosulfuric acid may be used to insure complete reaction.

The conditions for the reaction with a thiosulfate salt are the following. With an alkali metal thiosulfate, an alkaline earth metal thiosulfate, or thallous thiosulfate, the reaction is conveniently carried out at room temperature for a period of about one to four hours. The temperature and duration in these cases are not especially critical, however, and may be varied widely. When ammonium thiosulfate is used, the reaction is best carried out at the reflux temperature of the reaction mixture for a period of about 3 to 4 hours. Other temperatures within the range of 20 to 120° C. and other reaction times, from one hour to 12 hours and longer, may also be used, depending somewhat on the aziridine starting material and solvent chosen. While equivalent quantities of the reactants may be employed in the reaction with any of these thiosulfate salts, to insure complete reaction, it is preferable to use a slight excess of the thiosulfate salt.

The aziridine compounds having Formula XIII above that are used as starting materials in the foregoing reaction are prepared by reacting an alkyl halide compound having Formula II above with ethyleneimine in the presence of a base.

The compounds of the invention are new chemical compounds that are useful as pharmacological agents. They are antiradiation agents that are active in protecting against the effects of exposure to X-ray or gamma ray radiation. They are active upon oral or parenteral administration. Parenteral administration is preferred.

The compounds of the invention can be used either in the free acid form, having Formula I above, or in the form of a pharmaceutically-acceptable salt formed with an alkali metal hydroxide, an alkali metal carbonate, an alkali metal alkoxide, a quaternary ammonium hydroxide, or an alkaline earth metal hydroxide. In the free acid form the compounds of the invention exist as internal salts that may also be represented by the formula

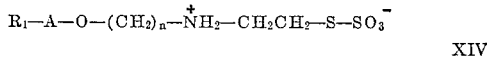

XIV where $R_1$, A, and $n$ are as defined previously. Pharmaceutically-acceptable salts of the aminoethyl thiosulfate compounds of the invention are prepared as described above or by reaction of the selected aminoethyl thiosulfate compound in the free acid form with a dilute solution of an equivalent amount of the selected base in an unreactive solvent, such as water or a lower alkanol. The preferred salts are the salts of an alkali metal, which are preferably prepared by reacting a selected aminoethyl thiosulfate compound in free acid form with an equivalent amount of an alkali metal alkoxide in a lower alkanol solvent.

The invention is illustrated by the following examples:

Example 1

To a solution of 56 g. of sodium S-2-aminoethyl thiosulfate in 500 ml. of 95% ethanol, heated under reflux, is added dropwise over a period of 90 minutes a solution of 37 g. of 5-(cyclopentyloxy)pentyl bromide in 100 ml. of ethanol, and the resulting mixture is heated under reflux for 47 hours. The mixture is distilled to remove 450 ml. of solvent, 450 ml. of water is added, and the aqueous solution is made slightly acidic (pH 6) with glacial acetic acid. This solution is cooled in an ice bath, and the oily precipitate of S-2-{[5-(cyclopentyloxy)pentyl]amino} ethyl thiosulfate that is obtained is isolated and purified by successive crystallizations from ethanol-ether, acetone-ether, ethyl acetate, water and acetone; M.P. 200–202° C.

The potassium salt of S-2-{[5-(cyclopentyloxy)pentyl]amino}ethyl thiosulfate is obtained by treating a methanolic solution of 2.0 g. of the free acid at room temperature with an equivalent amount of 10% aqueous potassium hydroxide, evaporating the resulting mixture to dryness under reduced pressure, and crystallizing the solid salt from methanol.

The 5-(cyclopentyloxy)pentyl bromide starting material is prepared as follows. Cyclopentanol (43 g.) is added dropwise to 12 g. of sodium hydride in 900 m. of toluene, and the mixture is heated under reflux for one hour. To the cooled mixture is then added 230 g. of 1,5-dibromopentane, and the mixture is heated under reflux for 18 hours and hydrolyzed by treatment with water. The organic phase is separated, washed with water and with saturated aqueous sodium chloride, dried, and evaporated to give a residue of crude 5-(cyclopentyloxy)pentyl bromide, suitable for use without further purification.

Example 2

Utilizing the general procedure described in Example 1 above, the following aminoethyl thiosulfate compounds are prepared from the reaction of sodium S-2-aminoethyl thiosulfate with the designated alkyl halide compound.

(a) From reaction with 6-(cyclopentyloxy)hexyl bromide there is obtained S-2-{[6-cyclopentyloxy)hexyl] amino}ethyl thiosulfate; M.P. 197–200° C., following successive crystallizations from acetone and from 2-butanone.

(b) From reaction with 5-[(1-methylcyclohexyl)oxy] pentyl bromide there is obtained S-2-[{5-[(1-methylcyclohexyl)oxy]pentyl}amino]ethyl thiosulfate; M.P. 196–199° C., following successive crystallizations from ethyl acetate, acetonitrile, water, and acetonitrile.

(c) From reaction with 5-[(2-methylcyclohexyl)oxy] pentyl bromide there is obtained S-2-[{5-[(2-methylcyclohexyl)oxy]pentyl}amino]ethyl thiosulfate; M.P. 213–215° C., following crystallization from ethanol.

(d) From reaction with 8-(cyclohexyloxy)octyl bromide there is obtained S-2-{[8-(cyclohexyloxy)octyl] amino}ethyl thiosulfate; M.P. 188–191° C., following successive crystallizations from ethanol and from methanol.

(e) From reaction with 4-(2-cyclohexylethoxy)butyl bromide there is obtained S-2-{[4-(2-cyclohexylethoxy) butyl]amino}ethyl thiosulfate; M.P. 192–195° C., following successive crystallizations from acetone-ether and from acetone.

(f) From reaction with 4-bromobutyl cycloheptyl ether there is obtained S-2-{[4-(cycloheptyloxy)butyl]amino} ethyl thiosulfate; M.P. 198–200° C., following crystallization from ethanol.

(g) From reaction with 5-bromopentyl cycloheptyl ether there is obtained S-2-{[5-(cycloheptyloxy)pentyl] amino}ethyl thiosulfate; M.P. 196–202° C., following successive crystallizations from ethanol and acetone.

(h) From reaction with 4-bromobutyl cyclooctyl ether there is obtained S-2-{[4-(cyclooctyloxy)butyl]amino} ethyl thiosulfate; M.P. 194–195° C., following crystallization from 2-butanone.

(i) From reaction with 5-[(3-cyclohexen-1-yl)oxy] pentyl bromide there is obtained S-2-[{5-[(3-cyclohexen-1-yl)oxy]pentyl}amino]ethyl thiosulfate.

(j) From reaction with 5-[(2-methyl-5-methoxycyclohexyl)oxy[pentyl bromide there is obtained S-2[{5-[(2-methyl - 5 - methoxycyclohexyl)oxy]pentyl}amino]ethyl thiosulfate.

(k) From reaction with 5-[(decahydro - 2 - naphthyl) oxy]pentyl bromide there is obtained S-2-[{5-[(decahydro-2-naphthyl)oxy]pentyl}amino]ethyl thiosulfate.

The alkyl halide compounds listed below, that are used as starting materials in the procedure of this example, are prepared from the reaction of the appropriate alkanol compounds with the appropriate alkylene dihalide compound in the presence of sodium hydride according to the procedure described in Example 1 above for the preparation of 5-(cyclopentyloxy)pentyl bromide.

(a) 6-(cyclopentyloxy)hexyl bromide; B.P. 100–120° C./0.35 mm. Hg.

(b) 5-[(1-methylcyclohexyl)oxy]pentyl bromide; B.P. 93–105° C./0.55 mm. Hg.

(c) 5-[(2-methylcyclohexyl)oxy]pentyl bromide; B.P. 87–92° C./0.3 mm. Hg.

(d) 8-(cyclohexyloxy)octyl bromide; B.P. 126–140° C./0.5 mm. Hg.

(e) 4-(2-cyclohexylethoxy)butyl bromide; B.P. 97–102° C./0.5 mm. Hg.

(f) 4-bromobutyl cycloheptyl ether; B.P. 95–115° C./0.6 mm. Hg.

(g) 5-bromopentyl cycloheptyl ether; B.P. 97–110° C./0.4 mm. Hg.

(h) 4-bromobutyl cyclooctyl ether; B.P. 108–117° C./0.45 mm. Hg.

(i) 5-[(3-cyclohexene-1-yl)oxy]pentyl bromide.

(j) 5 - [(2 - methyl - 5-methoxycyclohexyl)oxy]pentyl bromide.

(k) 5-[(decahydro-napththyl)oxy]pentyl bromide.

Example 3

To a solution of 56 g. of sodium S-2-aminoethyl thiosulfate in 500 ml. of 95% ethanol, heated under reflux, is added dropwise over a period of 90 minutes a solution of 39 g. of 5-(cyclohexyloxy)pentyl bromide in 100 ml. of ethanol, and the resulting mixture is heated under reflux for 48 hours. The mixture is then concentrated to near-dryness, and the residue is treated with equal volume of cold 95% ethanol. The resulting mixture is filtered and the filtrate is evaporated to dryness to yield an oily residue that is purified by repeating the ethanol treatment, filtration, and evaporation 4 more times. From the final evaporation there is obtained an oily residue of S-2-{[5-(cyclohexyloxy)pentyl]amino}ethyl thiosulfate, which is crystallized by trituration with ether and recrystallized from acetone; M.P. 207–208° C.

In a similar manner, from the reaction of 6-bromohexyl cyclohexyl ether with sodium S-2-aminoethyl thiosulfate there is obtained S - 2-{[6-(cyclohexyloxy)hexyl]amino} ethyl thiosulfate; M.P. 209–211° C., following crystallization from aqueous ethanol.

The 6-bromohexyl cyclohexyl ether starting material, B.P. 87–97° C./0.1 mm. Hg, is prepared by reacting cyclohexanol with 1,6-dibromohexane in the presence of sodium hydride according to the procedure described in Example 1 above for the preparation of 5-(cyclopentyloxy)pentyl bromide.

Example 4

To a solution of 56 g. of sodium S-2-aminoethyl thiosulfate in 500 ml. of 95% ethanol, heated under reflux, is added dropwise over a period of 90 minutes a solution of 52 g. of 5-[(4-methylcyclohexyl)oxy]pentyl bromide in 100 ml. of ethanol, and the resulting mixture is heated under reflux for 48 hours and then distilled to remove 450 ml. of solvent. Water (450 ml.) in added, and the aqueous solution is made slightly acidic (pH 6) with glacial acetic acid and evaporated to dryness. The oily residue is treated with an equal volume of boiling ethanol, the mixture obtained is filtered and the filtrate is evaporated to yield an oily residue of S-2-[{5-[(4-methylcyclohexyl)oxy]pentyl}amino]ethyl thiosulfate, which is crystallized by treatment with 10% aqueous ethanol, isolated, dried, and then recrystallized successively from ethyl acetate and from ethanol; M.P. 209–210° C.

In a similar manner, from the reaction of 4-bromobutyl 1-cyclohexylpropyl ether with sodium S-2-aminoethyl thiosulfate there is obtained S-2-{[4-(1-cyclohexylpropoxy)butyl]amino}ethyl thiosulfate; M.P. 170–171° C., following purification by washing with hot water and crystallizing from acetone.

The starting materials, which are listed below, are prepared by utilizing procedures described earlier herein.

(a) 5-[(4-methylcyclohexyl)oxy]pentyl bromide, B.P. 90–100° C./0.5 mm. Hg, from the reaction of 4-methylcyclohexanol with 1,5-dibromopentane in the presence of sodium hydride.

(b) 4-bromobutyl 1-cyclohexylpropyl ether, B.P. 112–120° C./1.2 mm. Hg, from the reaction of 1-cyclohexyl-1-propanol with 1,4-dibromobutane in the presence of sodium hydride.

Example 5

To a solution of 53.6 g. of sodium S-2-aminoethyl thiosulfate in 500 ml. of 95% ethanol, heated under reflux, is added dropwise over a period of 90 minutes a solution of 68 g. of 5-(cyclohexylmethoxy)pentyl bromide in 500 ml. of 95% ethanol, and the resulting mixture is heated under reflux for 36 hours. The mixture is then distilled to half-volume, 300 ml. of water is added, and the aqueous solution is made slightly acidic (pH 6) with glacial acetic acid. This solution is cooled in an ice bath and the solid precipitate that is obtained is removed by filtration and discarded. The filtrate is evaporated to yield an oily residue of S-2-{[5-(cyclohexylmethoxy)pentyl]amino}ethyl thiosulfate, which is crystallized by trituration with ether, isolated, dried and recrystallized from acetone; M.P. 201–203° C.

The 5-(cyclohexylmethoxy)pentyl bromide starting material, B.P. 98–100° C./0.66 mm. Hg, is prepared by reacting cyclohexylcarbinol with 1,5-dibromopentane in the presence of sodium hydride according to the analogous procedure described earlier herein.

Example 6

To a solution of 6.2 g. of 2-{[5-(cyclooctyloxy)pentyl]amino}ethyl disulfide in 100 ml. of ethanol is added an aqueous ammonium sulfite solution (freshly prepared by bubbling 4.8 g. of sulfur dioxide into 82 ml. of water and neutralizing the resulting solution with ammonium hydroxide), and air is passed through the solution for 20 hours at room temperature. The mixture is then evaporated and the residue of S-2-{[5-(cyclooctyloxy)pentyl]amino}ethyl thiosulfate that is obtained is washed with cold water, isolated, dried, and crystallized from 2-butanone; M.P. 200–203° C.

The potassium salt of S-2-{[5-(cyclooctyloxy)pentyl]amino}ethyl thiosulfate is obtained by treating a methanolic solution of 2.0 g. of the free acid at room temperature with an equivalent amount of 10% aqueous potassium hydroxide, evaporating the resulting mixture to dryness under reduced pressure, and crystallizing the solid salt from methanol.

The 2-{[5-(cyclooctyloxy)pentyl]amino}ethyl disulfide starting material is prepared as follows. A mixture consisting of 14.7 g. of sodium cyanide and 75 ml. of dimethyl sulfoxide is heated to 90° C., heating is discontinued, and to the stirred mixture is carefully added 65.8 g. of 4-(cyclooctyloxy)butyl bromide at such a rate so as to maintain the temperature below 150° C. The reaction mixture is stirred until the temperature drops to 50° C., is diluted with water, and the aqueous mixture is extracted with ether. The ether extracts are washed several times with saturated aqueous sodium chloride, dried, and evaporated to give 5-(cyclooctyloxy)valeronitrile, used in the following step without further purification. A solution of 10 g. of this nitrile intermediate in 250 ml. of absolute ethanol is treated with 20 g. of sodium, carefully added in three portions. When all of the metal has dissolved, the mixture is evaporated to near-dryness, and the residue is extracted with ether. The ether extract is treated with excess hydrogen chloride, and the 5-(cyclooctyloxy)-pentylamine hydrochloride that precipitates is isolated, dried, and carefully neutralized with 5% aqueous potassium hydroxide to give the free base amine, used without further purification. A mixture consisting of 85.3 g. of 5-(cyclooctyloxy)pentylamine, 20 g. of ethyl 2-mercaptoethyl carbonate, and 100 ml. of toluene is heated under reflux overnight and then distilled to give 2 - {[5 - (cyclooctyloxy)pentyl]amino} ethanethiol, B.P. 125–129° C./0.007 mm. Hg. This product is dissolved and the ethereal solution is treated with an excess of hydrogen chloride and evaporated to dryness to give 2-{[5-(cyclooctyloxy)pentyl]amino}ethanethiol hydrochloride; M.P. 164–169° C. To a solution of 8 g. of 2-{[5-(cyclooctyloxy)pentyl]amino}-ethanethiol hydrochloride in 300 ml. of methanol is added dropwise a solution of 3.42 g. of iodine in 100 ml. of methanol, and the resulting mixture is made basic by the addition of 65 ml. of 1 N sodium hydroxide. The basic mixture is evaporated, the residue is extracted with ether, and the ether extract is washed with saturated aqueous sodium chloride, dried, and treated with excess hydrogen chloride to precipitate 2 - {[5 - (cyclooctyloxy)pentyl]amino}ethyl disulfide hydrochloride, M.P. 198–200° C. The desired free base starting material, used above without further purification, is obtained by dissolving the hydrochloride salt in water, neutralizing the solution with 5% aqueous sodium hydroxide, and isolating the precipitate obtained.

Example 7

A mixture consisting of 31.5 g. of 2-{[4-(cyclohexyloxy)butyl]amino}ethyl bromide hydrochloride, 27.2 g. of sodium thiosulfate pentahydrate, and 100 ml. of 25% ethanol is heated under reflux for one hour and then evaporated to give S-2-{[4-(cyclohexyloxy)butyl]amino}ethyl thiosulfate, which is washed with water, isolated, dried, and crystallized successively from acetone and from ethanol; M.P. 198–200° C.

The sodium salt of S-2-{[4-(cyclohexyloxy)butyl]amino}ethyl thiosulfate is obtained by treating a methanolic solution of 2.0 g. of the free acid with an equivalent amount of sodium methoxide, evaporating the resulting mixture to dryness under reduced pressure, and crystallizing the solid salt from methanol.

The starting material is prepared as follows. 3-bromopropyl cyclohexyl ether, B.P. 110–113° C./13 mm. Hg, is first prepared by reacting cyclohexanol with 1,3-dibromopropane in the presence of sodium hydride, according to the analogous procedure described earlier herein. This brominated ether product is then converted to 4-(cyclohexyloxy)butyronitrile by reaction with sodium cyanide, and the nitrile intermediate is reduced by reaction with sodium in ethanol to give 4-(cyclohexyloxy)butylamine, utilizing procedures for analogous reactions described in Example 6 above. To a solution of 10.3 g. of 4-(cyclohexyloxy)butylamine in 30 ml. of methanol is added 2.6 g. of ethylene oxide, the resulting mixture is heated at 45–60° C. for one hour, and is then evaporated to give 2-{[4-(cyclohexyloxy)butyl]amino}ethanol, used in the following step without further purification. 2-{[4-(cyclohexyloxy)butyl]-amino}ethanol (9.7 g.) is added dropwise at room temperature to dibromotriphenoxyphosphorane (prepared by adding 7.2 g. of bromine dropwise to 13.9 g. of chilled triphenyl phosphite and washing the product obtained with ether), and the resulting mixture is extracted with ether. The ether extract is washed with water, dried, and treated with excess hydrogen chloride to precipitate the desired 2-{[4-(cyclohexyloxy)-butyl]amino}ethyl bromide hydrochloride starting material, suitable for use without further purification.

Example 8

A mixture consisting of 23.9 g. of 1-[5-(cyclooctyloxy)pentyl] aziridine, 18.5 g. of ammonium thiosulfate, and 250 ml. of methanol is stirred and heated under reflux for 4 hours, cooled, filtered, and the filtrate evaporated to gives S-2-{[5-(cyclooctyloxy)pentyl]amino}ethyl thiosulfate, which is washed with cold water, isolated, dried, and crystallized from 2-butanone; M.P. 200–203° C.

The sodium salt of S-2-{[5-(cyclooctyloxy)pentyl]amino}ethyl thiosulfate is obtained by treating a methanolic solution of 2.0 g. of the free acid at room temperature with an equivalent amount of sodium methoxide, evaporating the resulting mixture to dryness under reduced pressure, and crystallizing the solid salt from methanol.

The aziridine starting material is prepared as follows. To 12 g. of sodium hydride in 900 ml. of toluene is added dropwise 64 g. of cyclooctanol, and the mixture is heated under reflux overnight. To the cooled mixture is then added 230 g. of 1,5-dibromopentane, and the resulting mixture is heated under reflux for 32 hours and hydrolyzed by treatment with water. The organic phase is separated, washed with water and with saturated aqueous sodium chloride, dried, and evaporated to give a residue of crude 5-(cyclooctyloxy)pentyl bromide, purified by distillation; B.P. 120–129° C./0.1 mm. Hg. A mixture consisting of 40 g. of 5-(cyclooctyloxy)pentyl bromide, 60.3 g. of ethyleneimine, 23.4 g. of powdered potassium carbonate, and 40 ml. of absolute ethanol is heated under reflux for 41 hours, cooled, filtered, and evaporated. The oily residue is treated with ether, the ethereal mixture is filtered, and the filtrate is distilled to give the desired 1-[5 - (cyclooctyloxy)pentyl]aziridine starting material; B.P. 110–116° C./0.25 mm. Hg.

What is claimed is:

1. A member of the class consisting of aminoethyl thiosulfate compounds, having in the free acid form the formula, $$R_1-A-O-(CH_2)_n-NH-CH_2CH_2-S-SO_3H$$

and pharmaceutically-acceptable salts thereof; where $R_1$ represents a member of the class consisting of cyclopentyl, cyclohexyl, cycloheptyl, cyclooctyl, methylcyclohexyl, 2-methy - 5 - methoxycyclohexyl, cyclohexenyl, and decahydro-2-naphthyl; A represents a member of the class consisting of a direct bond and linear and branched alkylene radicals containing from 1 to 3 carbon atoms; and $n$ is a positive integer having a value from 4 to 8 inclusive.

2. A compound according to claim 1 which is S-2-{[4-(cyclooctyloxy butyl]amino}ethyl thiosulfate.

3. A compound according to claim 1 which is S-2-{[5-(cyclooctyloxy)pentyl]amino}ethyl thiosulfate.

4. A compound according to claim 1 which is S-2-{[5-(cyclohexyloxy)pentyl]amino}ethyl thiosulfate.

5. A compound according to claim 1 which is S-2-[{5-[(2 - methylcyclohexyl)oxy]pentyl}amino]ethyl thiosulfate.

6. A compound according to claim 1 which is S-2-{[6-(cyclopentyloxy)hexyl]amino}ethyl thiosulfate.

References Cited

UNITED STATES PATENTS 3,364,247  1/1968  Gollis  260—453

OTHER REFERENCES

Holmberg et al., Nature, vol. 183, p. 832, 1959.
Citarel et al., United States Government Research Report, AD294 344, 1962.
Field et al., Journal of Medicinal and Pharmaceutical Chemistry, vol. 7, p. 39–44, 1964.
Journal of Medicinal Chemistry, vol. 7(6), p. 823–824.

CHARLES B. PARKER, *Primary Examiner.*

S. T. LAWRENCE III, *Assistant Examiner.*